United States Patent [19]

Jost

[11] Patent Number: 5,171,098

[45] Date of Patent: Dec. 15, 1992

[54] APPARATUS FOR RELEASABLY CONNECTING TWO ROD SECTIONS

[75] Inventor: Peter Jost, Rinteln, Fed. Rep. of Germany

[73] Assignee: R K Rose & Krieger GmbH & Co. KG, Fed. Rep. of Germany

[21] Appl. No.: 736,587

[22] Filed: Jul. 26, 1991

[30] Foreign Application Priority Data

Oct. 4, 1990 [DE] Fed. Rep. of Germany ... 9013802[U]

[51] Int. Cl.⁵ .............................................. F16B 9/00
[52] U.S. Cl. .................................. 403/252; 403/255; 403/264
[58] Field of Search ............... 403/252, 254, 255, 192, 403/263, 264, 407.1, 406.1, 231, 230, 247, 262, 190

[56] References Cited

U.S. PATENT DOCUMENTS

| 3,336,004 | 8/1967 | Edie et al. ........................ 403/264 X |
| 3,379,398 | 4/1968 | Boccone ........................... 403/264 X |
| 3,592,493 | 7/1971 | Goose ............................... 403/264 X |
| 4,108,422 | 8/1978 | Fleischmann ................... 403/255 X |

FOREIGN PATENT DOCUMENTS

| 3604989 | 8/1987 | Fed. Rep. of Germany . |
| 3818483 | 12/1989 | Fed. Rep. of Germany ...... 403/255 |
| 2215425 | 9/1989 | United Kingdom ................ 403/252 |

*Primary Examiner*—Peter M. Cuomo
*Attorney, Agent, or Firm*—Laubscher & Laubscher

[57] ABSTRACT

A device for releasably connecting first and second rods together is characterized by a connecting flange mounted on one end surface of the first rod by a self-tapping screw. The flange includes at least one latch projecting from a surface thereof to engage a recess in the first rod in a form-locking manner. With the flange mounted on the end of the first rod, the first rod is connected with a side of the second rod so that the rods have perpendicular longitudinal axes. The second rod contains a groove along its side in which a pair of nuts are retained. Fastening screws pass through grooves in the first rod, through openings in the flange and into tap holes in the nuts to threadably connect the first rod with the second.

4 Claims, 2 Drawing Sheets

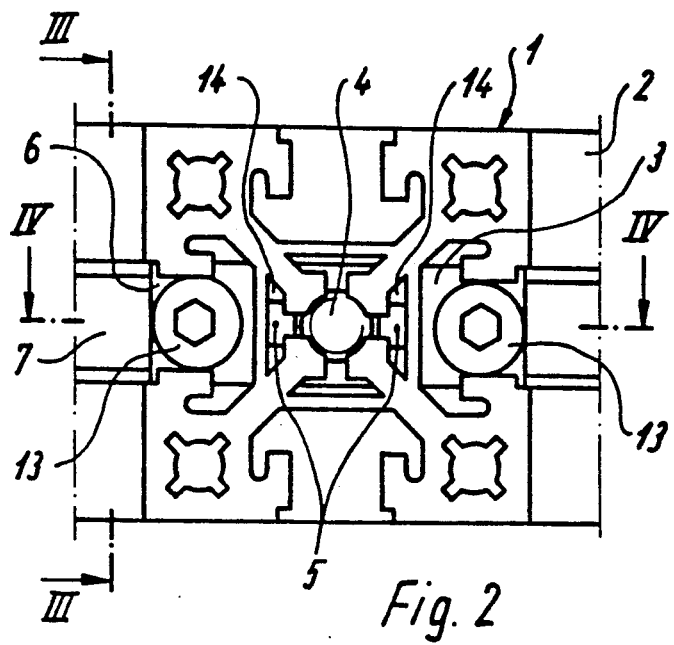
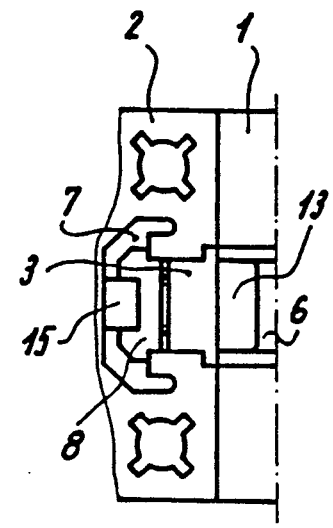
Fig. 2  Fig. 3
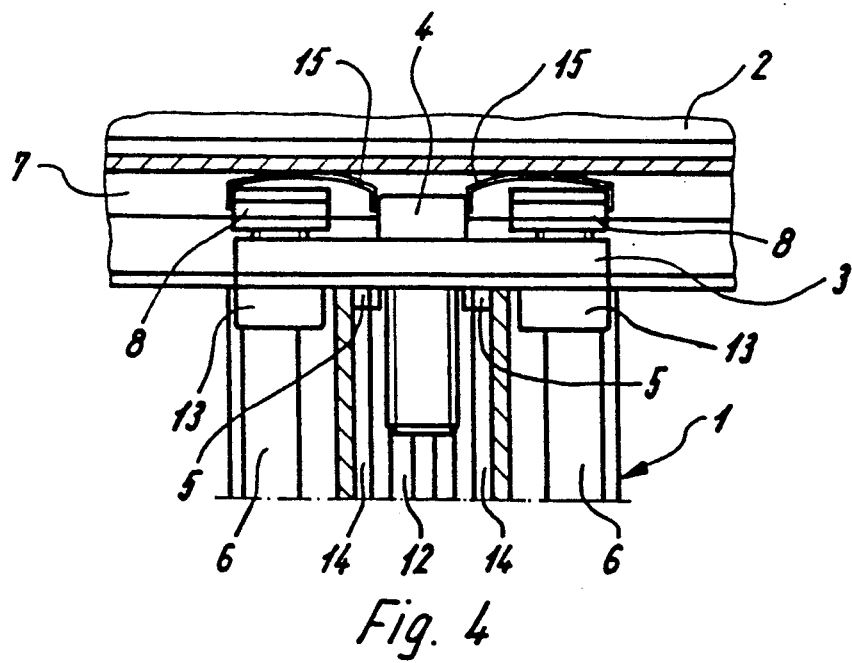
Fig. 4

APPARATUS FOR RELEASABLY CONNECTING TWO ROD SECTIONS

BACKGROUND OF THE INVENTION

The present invention relates to a device for releasably connecting first and second sections of rod with the rods having perpendicular longitudinal axes when connected.

Such devices are known in the prior art as evidenced by DE-OS 3604989. While such devices operate satisfactorily, there are certain inherent drawbacks in the production thereof. Essentially, the prior releasable connection devices require a large number of parts which are necessary to fix a connecting flange onto the first rod. Thus, the costs of manufacture are relatively high which hinders economical production. Moreover, assembly of the prior connection device is more difficult and time consuming—again because of the large number of parts required—which further increases the costs of production.

The present invention was developed in order to overcome these and other drawbacks of the prior art by providing a simple, economical device for releasably connecting a pair of rods using a connecting flange which is quickly and easily mounted on an end surface of a first rod for connecting the end of the first rod with a side of a second rod.

SUMMARY OF THE INVENTION

Accordingly, it is a primary object of the present invention to provide an apparatus for releasably connecting first and second rods together with the longitudinal axes of the rods being arranged perpendicularly. The first rod contains a longitudinal chamber and has an end surface which abuts against a side of the second rod. The side of the second rod contains a longitudinal groove in which at least one nut is arranged and retained. A connecting flange is mounted on the end surface of the first rod by a self-tapping screw which passes through a central opening in the flange and is tapped into the first rod chamber. At least one latch projects from the flange for engaging a recess in the first rod adjacent the chamber. The latch is locked into the recess in a form-locking manner to assist in connecting the flange with the first rod end surface. The first rod also contains at least one longitudinal groove within which is arranged a fastening screw. The fastening screw extends from the first rod end surface through a bore in the flange for threadable connection with the nut in the side groove of the second rod, thereby to connect the first rod with the second rod.

It is a further object of the invention to provide a pair of nuts and a pair of fastening screws therefor. The nuts are positioned in the groove of the second rod for alignment with the fastening screws by spring clips which are biased against the bottom of the groove and which abut against the head of the self-tapping screw when the device is in the assembled position.

BRIEF DESCRIPTION OF THE FIGURES

Other objects and advantages of the invention will become apparent from a study of the following specification when viewed in the light of the accompanying drawing, in which:

FIG. 2 is a bottom view of device of FIG. 1;

FIG. 3 is a sectional view of the device taken along line III—III of FIG. 2; and FIG. 4 is a sectional view of the device taken along line IV—IV of FIG. 2.

DETAILED DESCRIPTION

Figure 1:
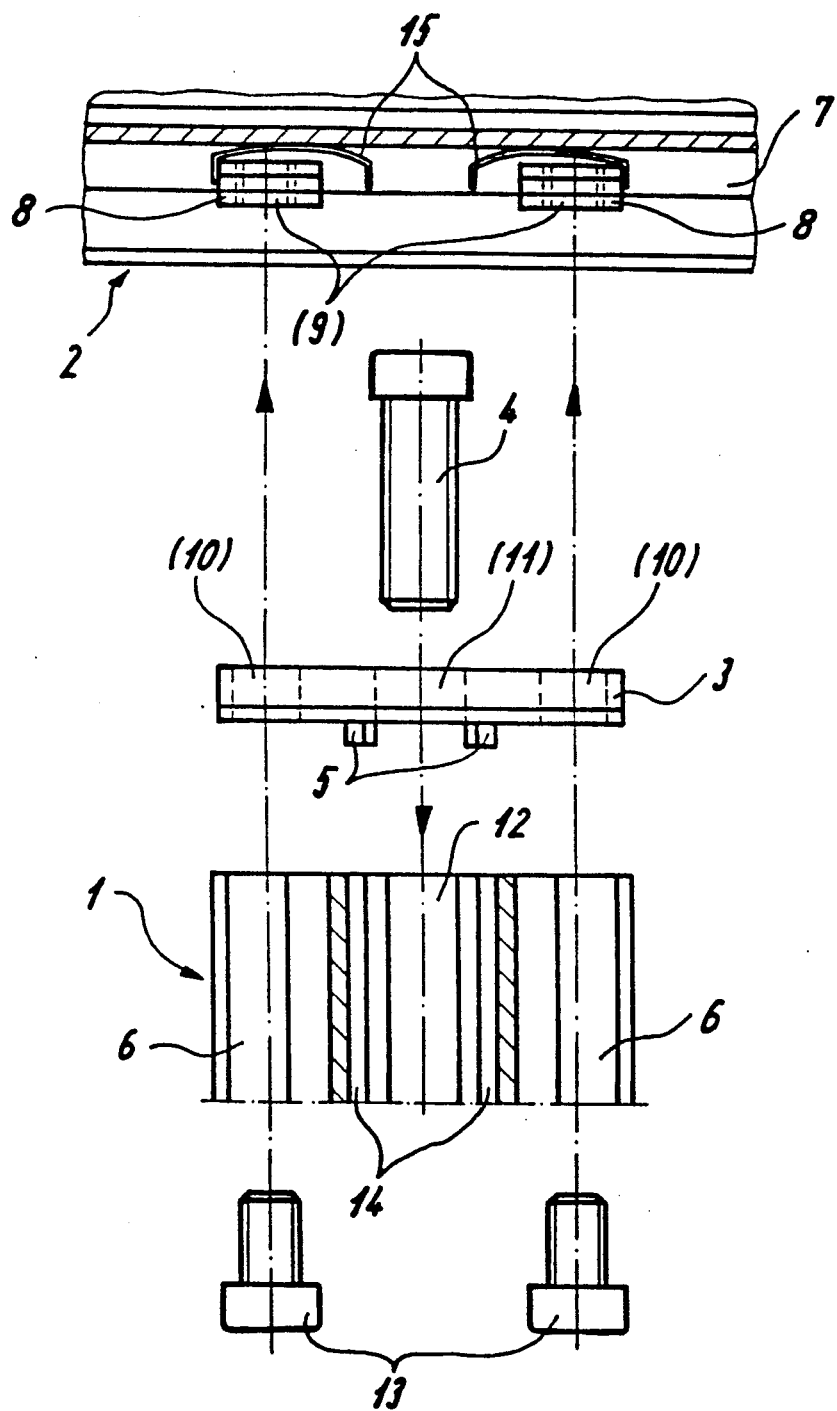
FIG. 1 is an exploded front view in partial section of the releasable connection device according to the invention.

The invention shown in FIGS. 1-4 is used to releasably connect a first rod 1 with a second rod 2. As shown in FIGS. 1 and 4, when the rods are connected, the end surface of the first rod 1 engages a side of the second rod 2. The rods are formed of a light-gauge metal using an extrusion press. The first rod contains a longitudinal chamber 12 and the second rod contains a groove 7 in the side thereof.

A connecting flange 3 is connected with the end surface of the first rod 1 by a self-tapping screw 4 which passes through a central opening or borehole 11 in the flange and into the longitudinal chamber 12 of the first rod. The screw is formed of a hardened metal such as steel. Thus, pre-tapping of threads in the chamber 12 is not required as is the case with the prior art devices. The diameter of the chamber 12 corresponds with the core diameter of the threaded portion of the self-tapping screw 4. Accordingly, as the screw is rotated into the chamber, the flange 3 is securely mounted on the end of the first rod 1 as shown in FIG. 4.

The first rod 1 also contains recesses 14 beyond the longitudinal chamber. The recesses receive latches 5 molded with and projecting from the lower surface of the connecting flange 3. More particularly, the latches 5 engage the recesses 14 in a form-locking manner.

Referring once again to FIG. 1, a pair of nuts 8 are arranged and retained within the groove 7 in the side of the second rod 2. The nuts are used with a pair of fastening screws 13 to connect the first rod 1 having the flange 3 mounted thereon with the second rod 2. The screws 13 are arranged in longitudinal grooves 6 of the first rod and pass through openings 10 in the connecting flange 3 into tap holes 9 in the nuts 8.

In order to accurately position the nuts 8 within the groove 7 of the second rod, spring clips 15 are provided which are firmly connected with the nuts. The spring clips are biased against the bottom of the longitudinal groove 7 as shown in FIGS. 3 and 4. The spring clips are angled to abut against the head portion of the self tapping screw 4 and the length of each spring clip is selected so that when the spring clips abut against the screw head portion, the center axis of the tap hole of each nut is aligned with the opening 10 in the connecting flange and with the fastening screw 13.

Because the connecting flange 3 is firmly mounted onto the end surface of the first rod 1 by the screw 4 prior to placement of the first rod 1 against the side of the second rod 2, the head portion of the screw 4 will protrude into the groove 7 of the second rod following placement of the first rod against the second rod. Thus, the nuts 8 can each be inserted laterally into the groove 7 until the spring clips abut against the screw head portion, whereby the nuts are properly aligned.

Although the head portion of the self-tapping screw 4 is shown with a cylindrical configuration, other screw designs may be used. For example, the connecting flange 3 may be mounted on the first rod 1 by means of a countersunk screw, whereby it would be necessary to provide a corresponding depression on the side of the flange opposite the latches 5. Similarly, other shapes for the nuts 8 may be used in accordance with the shape of the self-tapping screw 4 and its head portion.

Regardless of the configuration of the nuts 8, it is desirable to include the spring clips 15 to prevent displacement of the nuts during assembly.

Referring now to FIG. 2, the latches 5 which project from the connecting flange 3 have a T-shaped cross-section with the middle shank or leg of the latches pointing in the direction of the screw 4. The recesses 14 are configured to match the cross-section of the latches to enable a form-fit or locking interconnection therebetween. The height of the latch and its cross-sectional dimensions can be selected so that the latch absorbs stress forces acting on the first rod.

In lieu of the two nuts 8 described and shown, it is possible to provide a single nut with two threaded tap holes. With this embodiment, pre-assembly of the entire device is possible. If a single nut is used, it must be provided with a corresponding recess to receive the head portion of the self-tapping screw.

An important feature of the connecting device of the invention is that a twisting safety connection and simultaneous forced alignment of the flange with the first rod is ensured by the latches. The latches are placed opposite each other on the longitudinal axis of the flange, but they may also be opposite each other lateral to the axis. The latching effect may be achieved if only one latch is provided, whereby a forced alignment of the flange is obtained where symmetrical rods are used. Because the flanges are made in large numbers using a casting operation, the latches can be molded with the flanges, thereby minimizing production costs.

What is claimed is:

1. Apparatus for releasably connecting first and second rods (1, 2) having longitudinal axes arranged perpendicularly, the first rod containing a longitudinal chamber (12) and having an end surface resting against a side of the second rod, the second rod containing a groove (7) extending longitudinally along the side thereof, comprising
   (a) a connecting flange member (3) adapted for mounting on said first rod end surface;
   (b) a self-tapping screw (4) passing through a first opening in said flange and tapping into said first rod longitudinal chamber for connecting said flange member with said first rod end surface;
   (c) latch means (5) projecting from said flange member for engaging a recess (14) in said first rod adjacent to said first rod chamber in a form-locking manner;
   (d) at least one nut (8) arranged and retained in the longitudinal groove of said second rod; and
   (e) at least one fastening screw (13) having an axis parallel to the longitudinal axis of said first rod, said fastening screw being arranged in a longitudinal groove of said first rod and passing through an opening in said flange for threadable connection with said nut, thereby to connect said first rod with said second rod.

2. Apparatus as defined in claim 1, wherein said latch means are molded on said flange.

3. Apparatus for releasably connecting first and second rods (1, 2) having longitudinal axes arranged perpendicularly, the first rod containing a longitudinal chamber (12) and having an end surface resting against a side of the second rod, the second rod containing a groove (7) extending longitudinally along the side thereof, comprising
   (a) a connecting flange member (3) adapted for mounting on said first rod end surface;
   (b) a self-tapping screw (4) passing through a first opening in said flange and tapping into said first rod longitudinal chamber for connecting said flange member with said first rod end surface;
   (c) latch means (5) projecting from said flange member for engaging a recess (14) in said first rod adjacent to said first rod chamber in a form-locking manner;
   (d) a pair of nuts (8) arranged and retained in the longitudinal groove of said second rod;
   (e) a pair of fastening screws (13) having axes parallel to the longitudinal axis of said first rod, said fastening screws being arranged in longitudinal grooves of said first rod and passing through openings in said flange for threadable connection with said nuts, respectively, thereby to connect said first rod with said second rod; and
   (f) spring means (15) biased against a bottom of said second rod longitudinal groove for positioning said nuts for alignment with said fastening screws.

4. Apparatus as defined in claim 3, wherein said spring means abut against opposite sides of a head of said self-tapping screw when the releasable connection device is in an assembled position.

* * * * *